US006624785B2

(12) United States Patent
Poliak et al.

(10) Patent No.: US 6,624,785 B2
(45) Date of Patent: Sep. 23, 2003

(54) RECEIVER DESIGNED TO PICK UP AN ELECTROMAGNETIC SIGNAL AND SYSTEM USING SUCH A RECEIVER

(75) Inventors: Juraj Poliak, Lausanne (CH); Jean Gramiger, Lausanne (CH); Pierre-Alain Nicati, Colombier (CH); Tibor Ganyi, Cham (CH)

(73) Assignee: Telectronic SA, La Chaux-de-Fonds (CH)

( * ) Notice: Subject to any disclaimer, the term of this patent is extended or adjusted under 35 U.S.C. 154(b) by 0 days.

(21) Appl. No.: 10/042,957

(22) Filed: Jan. 9, 2002

(65) Prior Publication Data

US 2002/0089448 A1 Jul. 11, 2002

(30) Foreign Application Priority Data

Jan. 9, 2001 (EP) .............................. 01810019

(51) Int. Cl.[7] ................................. G01S 1/00
(52) U.S. Cl. .................... 342/385; 342/448; 342/463
(58) Field of Search .................. 342/44, 385, 386, 342/357.07, 448, 450

(56) References Cited

U.S. PATENT DOCUMENTS

| 5,073,781 A | 12/1991 | Stickelbrocks | ............... 342/51 |
|---|---|---|---|
| 5,621,396 A | 4/1997 | Flaxl | ..................... 340/825.54 |
| 5,914,671 A | 6/1999 | Tuttle | ..................... 340/825.54 |
| 6,366,204 B1 * | 4/2002 | Zannier | ..................... 340/561 |
| 6,377,176 B1 * | 4/2002 | Lee | ..................... 340/572.1 |

FOREIGN PATENT DOCUMENTS

| FR | 2 756 953 A | 6/1998 |
|---|---|---|
| GB | 2 208 058 A | 2/1989 |
| GB | 2 238 210 A | 5/1991 |
| WO | WO 00 28475 | 5/2000 |
| WO | WO 00 54234 | 9/2000 |

* cited by examiner

*Primary Examiner*—Dao Phan
(74) *Attorney, Agent, or Firm*—Van Tassel & Associates

(57) ABSTRACT

A receiver designed to pick up an electromagnetic signal, comprises: a passive receiving antenna; a resonant circuit connected to the antenna, formed of passive components and replying, by transmitting an electric signal, to the electromagnetic signal picked up, and an electric signal processing circuit. This receiver also comprises a threshold comparator circuit defining a reference threshold and connected directly to the terminals of the resonant circuit to compare the electric signal, not amplified, with the reference threshold and to activate said processing circuit only when the amplitude of the electric signal exceeds the threshold. An object tracking system making use of the receiver described above is also disclosed.

6 Claims, 2 Drawing Sheets

RECEIVER DESIGNED TO PICK UP AN ELECTROMAGNETIC SIGNAL AND SYSTEM USING SUCH A RECEIVER

FIELD OF THE INVENTION

The present invention concerns a receiver designed to pick up an electromagnetic signal coming from a transmitter. It also concerns a system for tracking objects, incorporating such a receiver.

BACKGROUND OF THE INVENTION

In the state of the art, these receivers generally comprise:
a passive receiving antenna;
a resonant circuit connected to the antenna, formed of passive components and replying, by transmitting an electric signal, to the electromagnetic signal picked up, and
an electric signal processing circuit.

If such receivers are carried by a person and have to be constantly in listening mode, the source of electric energy which powers them has to be fairly large, failing which it is likely to be rapidly exhausted, because the known processing circuits consume a great deal of energy. These receivers can therefore be miniaturized only by reducing their self-sufficiency.

To reduce this consumption, document WO-00 28 475 includes an amplifier and a circuit for integration of the signals received, placed between the resonant circuit and the threshold comparator circuit. In this way, the processing circuit is activated only when the load integrated exceeds a limiting value. This procedure has two drawbacks, however. First, if the receiver is in the vicinity of the source, in an area where the electromagnetic signal slightly exceeds the background noise level, the threshold comparator circuit can be activated, whereas the level of the signal is inadequate to identify the transmitter in the vicinity of which the receiver is located. This, therefore, results in unwanted triggerings which increase the receiver's consumption. Secondly, if the receiver passes very quickly the transmitter, it is possible that the integrated load level may not be sufficient to activate the threshold comparator circuit.

In this way, the passage is not recorded. In other words, the reactions of the threshold circuit vary depending on the position and speed of the receiver. This greatly limits the conditions of use.

Similar solutions are described in documents EP 0440 153 and GB 2 208 058. In both of these documents, an integration circuit is placed between the resonant circuit and the threshold detector circuit, and the same problems are accordingly observed.

SUMMARY OF THE INVENTION

The purpose of the present invention is to counter these disadvantages. This is achieved due to the fact that the receiver in accordance with the invention, as described above, comprises a threshold comparator circuit, defining a reference threshold and connected directly to the terminals of the resonant circuit to compare the electric signal, not amplified, with the reference threshold and activate the processing circuit only when the amplitude of the signal exceeds that threshold. In other words, as soon as—and only when—the voltage of the signal picked up by the antenna and measured across the terminals of the resonant circuit exceeds the threshold value is the comparator circuit activated.

It is strongly recommended that the electromagnetic signal have a frequency in the range between 1 kHz and 1 MHz and that the natural frequency of the resonant circuit, formed of a capacitor and a coil connected in parallel, comply with the frequency of this signal.

The present invention has an especially interesting application in systems for tracking objects moving within a given space, especially for monitoring people in homes or hospitals. In this case, it is essential that the carried module may not hinder the person making use of it, and that its lifetime be as long as possible.

To this effect, the object tracking system according to the invention comprises:
a set of RF beacon transmitters, distributed throughout the space in question and fitted so as to each transmit an electromagnetic signal carrying a beacon identification code which is specific to it;
linked to each of the objects to track, a RF transmitter-receiver module including:
a RF beacon receiver to pick up the electromagnetic signal transmitted by the beacon to which it is closest and comprising a passive receiving antenna, a resonant circuit connected to the antenna, formed of passive components and replying, by transmitting an electric signal, to the electromagnetic signal picked up, and a threshold comparator circuit defining a reference threshold and connected directly to the terminals of the resonant circuit to compare the electric signal, not amplified, with the reference threshold and to deliver an activation signal when the amplitude of the electric signal exceeds the threshold, indicating that the object is in the vicinity of a beacon;
a processing circuit containing in memory an object identification code and replying to the activation signal by placing in memory the code of the beacon in the vicinity of which the object is located, and
an RF identification transmitter to transmit a signal carrying the module identification code and the stored beacon identification code;
at least one RF identification receiver to receive the signals transmitted by the module linked to the objects, and
a base station for processing the data received by the identification receiver.

Preferably, each module shall also comprise means of triggering transmission of the carrier signal either at the request of the person carrying the object, or automatically whenever the memory content is altered.

In some applications, for example when the antenna of the RF beacon transmitter must be located far from a source of energy, when it is in an open space, or again when two of them are close to one another, it is worthwhile having the system equipped with a RF beacon transmitter which includes a resonant circuit consisting of:
a coil provided with two terminals one of which is connected to earth;
a capacitor formed of a conducting plate placed on the ground in an area of the space in question and of said earth, and
a single conducting wire linking said plate to the other terminal of the coil.

BRIEF DESCRIPTION OF THE DRAWINGS

Other characteristics of the invention will become apparent from the following description, referring to the appended drawing, in which.

DETAILED DESCRIPTION OF THE PREFERRED EMBODIMENTS

Figure 1:
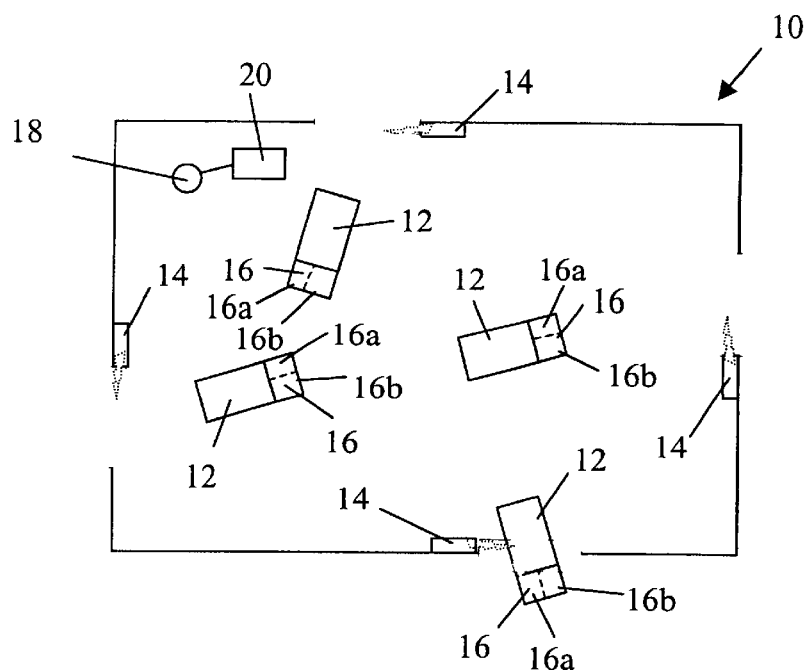
FIG. 1 presents, schematically, a system according to the invention.

The system shown in FIG. 1 is designed to track, in a space 10, the movement of moving objects 12 which could enter or leave this space. It comprises:

- a set of RF transmitters 14 serving as beacon in space 10 and each transmitting a signal which is specific to it, on a low-frequency carrier, e.g. 75 kHz;
- a set of RF transmitter-receiver modules 16, each associated with one of the objects 12 and comprising a RF beacon receiver 16a fitted so as to receive and process the signals coming from RF beacon transmitters 14 and an RF identification transmitter 16b to transmit a signal modulating a carrier of higher frequency, e.g. 434.01 MHz;
- an RF identification receiver 18 fitted so as to pick up the signals transmitted by identification transmitters 16b; and
- a base station 20 for processing the data picked up by identification receiver 18.

Space 10 may be enclosed, with access doors, such as, for example, a hospital or an elderly persons'home. It may also be a structured space, like a garden with avenues which define places of passage.

The modules 16 are designed to be carried by people liable to move in space 10 and who risk becoming lost there or escaping from there, as is the case for certain elderly or sick people.

The RF beacon transmitters 14 are placed all around space 10, on its walls, its doors and its places of passage, so that any module 16, carried by a person moving there, can receive the signal transmitted by one of the beacons.

The RF identification transmitter 16b transmits a signal automatically when passing close to a RF beacon transmitter 14 and/or at the request of the person carrying the module 16. This RF signal carries two items of information, namely the identification code of the last place of passage received from the RF beacon transmitter 14 and the identification code of module 16 itself.

The signal transmitted by the RF identification transmitter 16b is picked up by the RF identification receiver 18 which forwards it to base station 20, which can thus know the last place occupied in space 10 by the person carrying the module 16.

When the RF identification transmitter 16b transmits automatically a signal on passing near one of the transmitters 14, it is possible to know immediately when the person carrying a module 16 leaves space 10.

As a variant, the module 16 can be fitted with a control system which can be activated manually. In that case it is only when the person carrying it wants help that the RF identification transmitter 16b is set in action. The base station 20 is thus informed directly that the person carrying the transmitting module is calling for help and that they are in a region immediately identified by knowledge of the last beacon 14 encountered. It is obvious that both these solutions can be combined.

The antenna of the RF beacon transmitters 14 is formed of a coil with or without a ferromagnetic core. The variant with core is highly suitable when the antenna is to be installed outside, close to a path, for example. The variant without core is more suitable for cases in which the antenna is to be associated with a door. It is in that case formed of a wire surrounding the door.

In both of these cases, coupling between the RF beacon transmitters 14 and beacon receivers 16a takes place by induction. It is also possible to perform coupling by capacitance, as will be explained with reference to FIG. 3.

The power supply for the RF beacon transmitters 14 poses no particular problem, because they are fixed. When they are inside a building, they can be connected directly to the electricity mains. Outside, it is also possible to use an autonomous power supply, provided with a storage battery.

On the other hand, the power supply for transmitter-receiver modules 16 is much more complex. It is necessary that they should not only be as light and miniaturised as possible, but also that they should have great self-sufficiency. This implies that they should be small energy consumers.

The transmitter 16b equipping transmitter-receiver modules 16 has little effect on the overall consumption of energy, because it is actuated only for short periods of time, when passing in the vicinity of a transmitter 14 or when the control system is activated.

Figure 2:
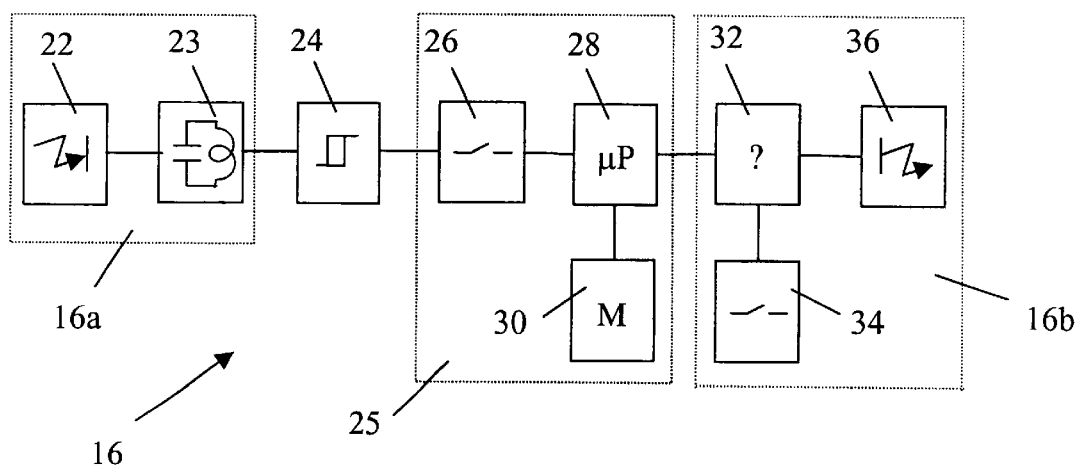
FIG. 2 shows the electronic diagram of a RF transmitter-receiver module, forming part of the system in FIG. 1 and designed to equip an object to be tracked.

The RF receiver 16a of the transmitter-receiver modules 16, on the other hand, must be constantly in listening mode, because passage in the vicinity of a transmitter 14 cannot be foreseen. It is therefore essential that its consumption be especially low. The transmitter-receiver module 16 shown schematically in FIG. 2 can meet this requirement.

As can be seen from this figure, the RF receiver 16a consists of a passive receiving antenna 22 designed to pick up the electromagnetic signals transmitted by the transmitters 14 and a resonant circuit 23 connected to antenna 22, formed of a coil and a capacitor and replying to the electromagnetic signal picked up by transmitting an electric signal. A threshold comparator circuit 24 is linked to the resonant circuit 23, so that the electric signal coming from the resonant circuit 23 may be applied to it, without amplification. The transmitter-receiver module 16 comprises, moreover, a processing circuit 25, formed of a triggering circuit 26 connected to the output of comparator 24, a microprocessor 28 actuated by triggering circuit 26 and a memory 30 associated with microprocessor 28 and containing the identification code of the module in question and the identification code of the last beacon transmitter 14 encountered.

The RF identification transmitter 16b comprises a polling circuit 32, linked to the microprocessor 28, which controls polling of memory 30, either at the request of the person carrying the module by actuating a switch 34, or automatically by microprocessor 28, whenever the content of memory 30 is altered, and a transmitter circuit 36. The latter transmits an electromagnetic identification signal, picked up by the receiver 18.

The resonant circuit 23 is tuned to the frequency of the electromagnetic field of beacon transmitters 14. When this frequency is 75 kHz, the coil comprises about 400 loops, corresponding to an inductance of approximately 16 mH, while the capacitor has a capacitance of 100 pF.

The threshold comparator circuit 24 and the triggering circuit 26 should preferably be incorporated in a single integrated circuit, e.g. that sold by the firm Linear Technology (USA) under the name LTC1440. Such a circuit, with a consumption of less than 10 $\mu$A compares, constantly or periodically, the signals received with a pre-set threshold value.

Until this threshold value is reached, i.e. so long as the module 16 is not close to a transmitter 14, the triggering circuit 26 maintains the microprocessor 28 at rest.

If, on the contrary, the threshold value is exceeded, which occurs when module 16 passes in the vicinity of a beacon transmitter 14, the triggering circuit 26 transmits an activation order to the microprocessor 28. The latter then analyses the signal received and stores in memory 30—which already contains the identification code of the module 16 known to the base station 20—the code of the nearby beacon transmitter 14.

When polling circuit 32 is activated, either by means of the switch 34, or by the microprocessor 28, the RF identification transmitter 16a generates a signal carrying the information contained in memory 30, i.e. the code module 16 and that of the last beacon transmitter 14 encountered. This signal takes the form of a pulse train, representing an 8-bit message for each information item transmitted. It is in this way possible to identify 256 beacon transmitters 14.

Figure 3:
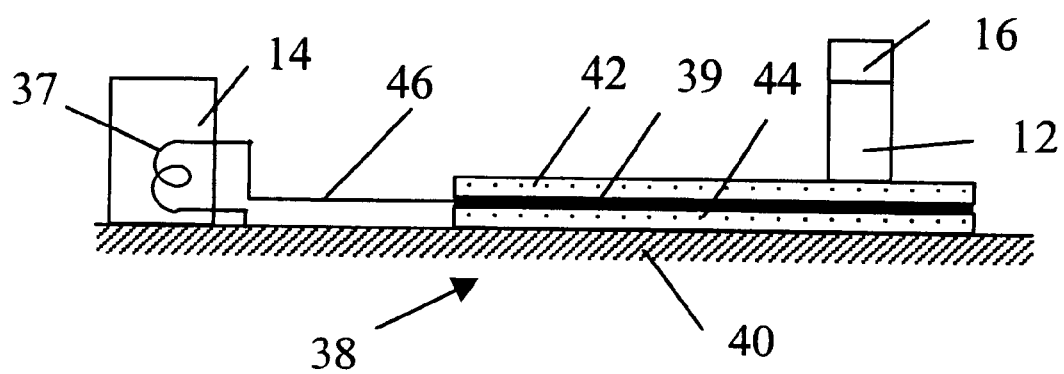
FIG. 3 is a diagram of an antenna which could equip the system in FIG. 1.

FIG. 3 shows a special beacon transmitter 14, in which the transmitting function is performed by a capacitive coupling. More precisely, the transmitter 14 consists of a resonant circuit including a coil 37 and a capacitor 38 comprising two electrodes, one of which consists of a plate of conductive material 39 and the other an earth connection 40. The plate 39 is held between two insulating layers 42 and 44 and placed on the ground. Plate 39 is linked to the rest of the beacon transmitter by means of a single conducting wire 46.

Practice has shown that the insulating layers 42 and 44 could be formed by the ground and the shoes of the person passing over plate 39 respectively. In other words, the plate of conductive material 39 can, without any other requirement, be placed directly on the ground.

A beacon transmitter 14, such as described with reference to FIG. 3, can ensure a capacitive coupling with beacon receivers 16a in good conditions, even in the open air, the transmission of information from beacon transmitter 14 to receiver 16a taking place when the latter passes over plate 39. The currents passing through conducting wire 46 (a few nA) and the voltages applied (a few Volts) are very small, so that this solution involves no risk and the means employed are inexpensive. The antenna range is limited to the region of passage above plate 39, so that two beacon transmitters 14 can be very close to one another without risk of confusion. Moreover, the components involved are very rugged, so that it is possible to install such a beacon transmitter 14 outside, without any particular protective measure.

The plate 39 should preferably be made of metal, e.g. aluminium, to prevent oxidation. It could also be made by means of a conducting or semi-conducting layer deposited on an insulating layer, e.g. glass. Its surface area is preferably between 0.2 and 2 $m^2$.

The message transmitted to the base station 20 should preferably include information relating to the last three beacon transmitters 14 encountered, enabling the route taken to be traced. This message can be supplemented by time information relating to the movements performed. In this case, a time base should be added to the transmitter-receiver modules 16 or the transmitters 14.

The system which has just been described therefore makes it possible to know in the vicinity of which beacon the person searched for can be found. It is, on the other hand, not possible to know in which direction the person was going on their last passage. To overcome this disadvantage, it may be useful to set up two adjacent transmitters 14, each associated with a specific signal. It is thus possible to know whether the last person entered or left, depending on whether it is the signal of one transmitter or the other that was last picked up.

What is claimed is:

1. Receiver (16a) designed to pick up an electromagnetic signal, including:
   a passive receiving antenna (22);
   a resonant circuit (23) connected to the antenna, formed of passive components and replying, by transmitting an electric signal, to the electromagnetic signal picked up, and
   a processing circuit (25) for said electric signal,
   characterized by the fact that it also incorporates a threshold comparator circuit (24) defining a reference threshold and connected directly to the terminals of the resonant circuit (23) to compare said electric signal, not amplified, with said reference threshold and activate said processing circuit (25) only when the amplitude of the electric signal exceeds the threshold.

2. Receiver according to claim 1, characterized by the fact that said electromagnetic signal has a frequency ranging between 1 kHz and 1 MHz and by the fact that the natural frequency of the resonant circuit, formed of a capacitor and a coil connected in parallel, is compatible with the frequency of said electromagnetic signal.

3. System for tracking objects (12) liable to move in a given space (10) characterized by the fact that it includes:
   a set of RF beacon transmitters (14), distributed throughout said space and fitted so as to each transmit an electromagnetic signal carrying a beacon identification code which is specific to it;
   linked to each of said objects (12), a RF transmitter-receiver module (16) including:
      a RF beacon receiver (16a) to pick up the electromagnetic signal transmitted by the beacon transmitter (14) to which it is closest and comprising a passive receiving antenna (22), a resonant circuit (23) connected to the antenna, formed of passive components and replying, by transmitting an electric signal, to the electromagnetic signal picked up, and a threshold comparator circuit (24) defining a reference threshold and connected directly to the terminals of the resonant circuit (23) to compare said electric signal, not amplified, with said reference threshold and to deliver an activation signal when the amplitude of the electric signal exceeds the threshold, indicating that the module is in the vicinity of a beacon;
      a processing circuit (25) containing in memory an module identification code and replying to the activation signal by placing in memory the code of said beacon, and
      a RF identification transmitter (16b) to transmit a signal carrying the object identification code and the stored beacon identification code;
   at least one RF identification receiver (18) to receive the signals transmitted by the identification transmitters (16b) linked to the modules (16), and
   a base station (20) for processing the data received by said identification receiver (18).

4. System according to claim 3, characterized by the fact that each identification transmitter (16b) also comprises means (34) of triggering transmission of its carrier signal at the request of the person carrying the module.

5. System according to claim 3, characterized by the fact that each identification transmitter (16b) also comprises means (34) of triggering transmission of its carrier signal automatically whenever the content in the memory of the processing circuit (25) is altered.

6. System according to claim 3, characterized by the fact that at least one of said RF beacon transmitters (14) includes a resonant circuit consisting of:
   a coil provided with two terminals one of which is connected to earth (40);
   a capacitor (38) formed of a conducting plate (39) placed on the ground in an area of said space (10) and said earth (40), and
   a single conducting wire (46) linking said plate (39) to the other terminal of the coil.

* * * * *